March 15, 1949.  M. E. WHITE  2,464,474
SIDING REPAIR JIG
Filed April 18, 1946  2 Sheets-Sheet 2
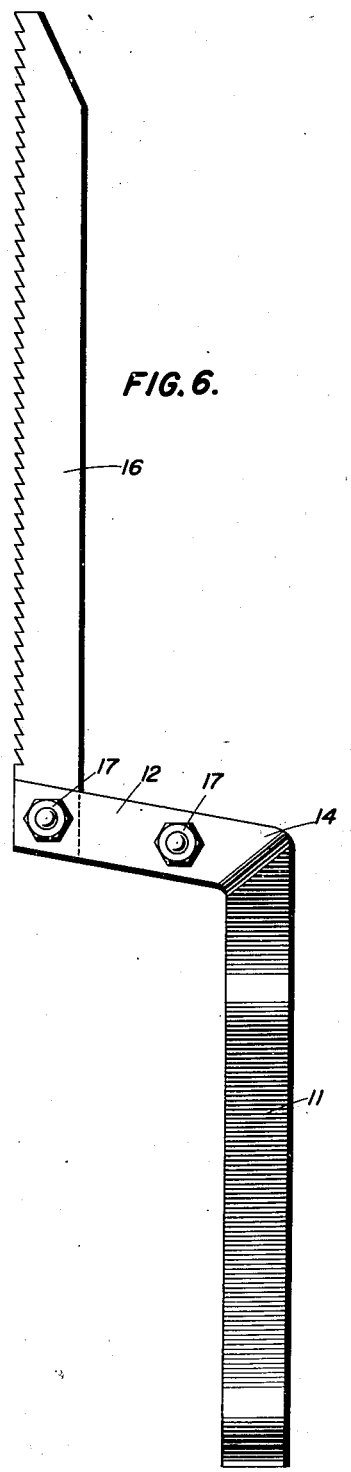
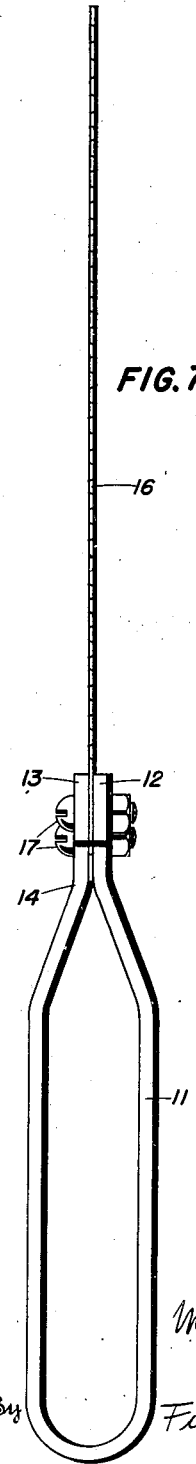
Inventor
Marcus E. White
By Fisher & Christen,
Attorneys.

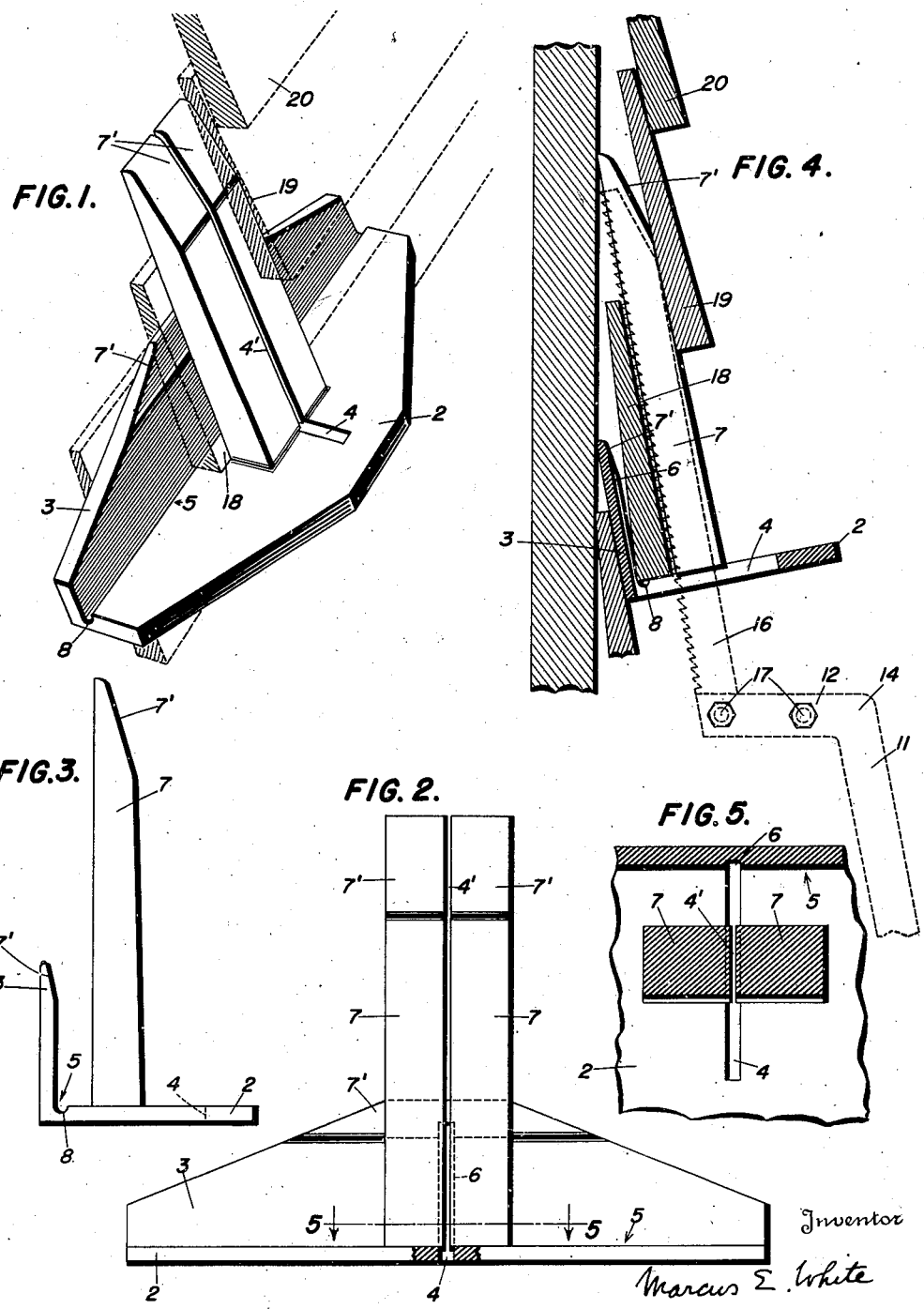

Patented Mar. 15, 1949

2,464,474

UNITED STATES PATENT OFFICE 2,464,474

SIDING REPAIR JIG

Marcus E. White, Cloquet, Minn., assignor of one-half to Irven F. Gianotti, Gilbert, Minn.

Application April 18, 1946, Serial No. 663,149

4 Claims. (Cl. 145—1)

This invention relates to a carpenter's tool, more particularly to a siding repair jig which is used in repair of siding, clapboards and the like.

In the repair of siding, it is very difficult to replace the worn or broken boards because of the trouble involved in loosening and removing them. In the past, it has been necessary to remove several boards adjacent the worn or broken one, involving considerable time and labor. Even if the board is replaced without removing the adjacent boards, the job is usually crudely done, and on numerous occasions the adjoining boards are so badly disfigured in the process that it becomes necessary to replace not one but several.

The principal object of this invention is to provide a siding repair jig that will greatly simplify the operation of replacing siding boards.

Another object is to provide a repair jig for siding that will separate the siding boards and space the one to be replaced from the others, and at the same time act as a guard and guide for a cutting tool.

Another object is to provide a handle for the saw to be used with the repair jig which is simple, cheap to manufacture and will space the operator's hand away from the building.

Another object is to provide a jig that is simple and sturdy in design and cheap to manufacture.

These and other objects and advantages of my invention will become apparent as the following description proceeds, having reference to the accompanying drawings in which Fig. 1 is a perspective view of the siding repair jig of this invention;

Fig. 2 is a side elevation of the jig;

Fig. 3 is an end view of the jig;

Fig. 4 is a vertical cross-section, showing the manner of use of the invention;

Fig. 5 is a fragmentary section of a detail, taken on the line 5—5 of Fig. 2;

Figs. 6 and 7 are side and top views of a special type of saw for use with the repair jig.

Referring now to these drawings, the repair jig is generally L-shaped, and comprises a shelf of base portion 2 and a foot or wedge portion 3, at right angles thereto.

The shelf 2 is provided with a lateral and centrally located opening 4 extending transversely of the shelf to its connection with the foot 3. This opening may extend through the foot 3 or may terminate at the joint 5 and communicate with a shallow groove 6 extending transversely of the foot 3. This opening 4 is provided so that a saw may be inserted. The groove 6 in the foot 3 is for the protection of the saw or other tool, so that when the cutting operation is finished, the cutting edge of the tool will not bear against the foot 3 and be dulled.

Attached to the shelf 2 and extending outwardly parallel with and spaced from the foot 3 is a pair of guides or fingers 7. These fingers are positioned at each side of the opening 4 and are spaced from the foot 3, a distance great enough for the reception of a siding board therebetween. The purpose of the fingers 7 is to act as a guard and guide for the cutting tool; the fingers define between them a saw receiving slot 4' communicating with the saw receiving opening 4 in the shelf 2. Fingers 7 also serve to raise the next upper or overlapping board away from the one being cut. Although the drawings show two fingers 7, which is the preferred form of the invention, one finger would be sufficient to carry out the operation. Inasmuch as it is necessary to cut the siding board straight so that a tight joint may be obtained when the new piece is matched with the remainder of the old, the use of the two fingers is desirable as they will act to keep the cutting tool in a straight line. If one finger is used, the carpenter must pay strict attention to the cutting operations as the saw will have a tendency to get out line and the cut would be on an angle which would be quite difficult to match and a good joint could not be obtained.

The foot 3 and the fingers 7 are beveled as at 7' so that they may be inserted more easily between and under the siding boards.

After siding has been painted several times, a bead of paint is formed along the lower inner edge of the boards. This bead of paint may be uneven and when the tool is inserted between the boards, it would act to put the tool out of line which would result in an angled cut. This is avoided by providing a groove 8 at the joining edges of the side 2 and the foot 3 which is deep enough to receive a bead of paint which otherwise would tend to throw the jig slightly out of line.

Referring to Figs. 6 and 7, which show the saw used with this repair jig, the handle of this saw consists of a strip of sheet metal 11, provided with sharply offset ends 12 and 13. In forming this handle, the strip 11 is folded at its center and the ends bent at 14, so that the fingers 12 and 13 will be offset and in side by side relationship. A saw blade 16 is then inserted between the fingers 12 and 13 and secured there by bolts or other fastening means 17. This saw is adapted to be used with the siding repair jig in that its special offset construction acts to keep the operator's hand away from the side of the building and so provides the necessary clearance for use of the saw.

Also, this type of saw permits the sawing of the second board above a door or window which ordinarily cannot be done with any type of saw.

To use the above described siding tool, the operation is as follows: The nails of the board 18 to be sawed and those in the two boards 19 and 20 above are removed one studding beyond where the saw cut is to be made. The foot 3 of the jig is then inserted under board 18 which is to be cut, and is pushed upwardly so that the board is between foot 3 and fingers 7, as in Fig. 4, with the bottom edge of the board against shelf 2. This separates the board 18 from the boards above and below it.

The saw is then inserted in the opening 4 and between the fingers 7 and is operated to cut the piece of siding to be replaced.

It is to be understood that the component parts of this device may be constructed of metal, wood or plastic, and that minor changes in the mechanical details thereof such as shall fall within the scope of the appended claims may be resorted to in practice whenever necessary.

I claim as my invention:

1. A siding repair jig for use in cutting siding, clapboards and the like while in place on a building, comprising a substantially flat, rigid, shelf-like base, a thin wedge extending outwardly from one face of the base and adapted to be forced in behind the siding to wedge it away from the building, a guide for a saw also extending from said one face of said base and in the same direction as said wedge, said wedge and said saw guide each being rigidly attached to said base and spaced apart a distance slightly greater than the thickness of the siding; said base being further provided with an opening adjacent said saw guide for receiving a saw for cutting a piece of siding as held between said wedge and said saw guide.

2. A siding repair jig for use in cutting siding, clapboards and the like while in place on a building, comprising a substantially flat, rigid, shelf-like base, a thin wedge extending outwardly from one longitudinal edge of the base and adapted to be forced in behind the siding to wedge it away from the building, a pair of parallel saw guides also extending outwardly from one face of said base and in the same direction as said wedge, said saw guides being spaced apart to define a saw receiving slot therebetween, said wedge and said saw guides each being rigidly attached to said base and spaced apart a distance slightly greater than the thickness of the siding, said base being further provided with an opening in alinement with the saw receiving slot between said saw guides, said opening permitting the operation of a saw in said slot for cutting a piece of siding as held between said wedge and said saw guides.

3. A siding repair jig for use in cutting siding, clapboards and the like while in place on a building, comprising a substantially flat, rigid, shelf-like base, a thin wedge extending outwardly from one face of the base and adapted to be forced in behind the siding to wedge it away from the building, a second wedge also extending from said one face of said base and in the same direction as said first wedge and having its outer edge beveled, and adapted to wedge an overlapping siding board away from said first siding board, said second wedge being rigidly attached to said base and spaced apart a distance slightly greater than the thickness of the siding; said base being further provided with an opening adjacent said second wedge for receiving a saw for cutting a piece of siding as held between said wedges.

4. A siding repair jig for use in cutting siding, clapboards and the like while in place on a building, comprising a substantially flat, rigid, shelf-like base, a thin wedge extending outwardly from one longitudinal edge of the base, and adapted to be forced in behind the siding to wedge it away from the building, a pair of parallel wedges also extending outwardly from said base and in the same direction as said first wedge and having their outer edges beveled, and adapted to wedge an overlapping siding board away from said first siding board, said parallel wedges being spaced apart to define a saw receiving slot therebetween, said first wedge and said parallel wedges each being rigidly attached to said base and spaced apart a distance slightly greater than the thickness of the siding, said base being further provided with an opening in alinement with the saw receiving slot between said parallel wedges, said opening permitting the operation of a saw in said slot for cutting a piece of siding as held between said first wedge and said parallel wedges.

MARCUS E. WHITE.

REFERENCES CITED

The following references are of record in the file of this patent:

UNITED STATES PATENTS

| Number | Name | Date |
| --- | --- | --- |
| 595,438 | Hall | Dec. 14, 1897 |
| 731,919 | Larson | June 23, 1903 |
| 798,818 | Morris | Sept. 5, 1905 |
| 865,621 | Wadsworth | Sept. 10, 1907 |
| 1,097,362 | Price | May 19, 1914 |
| 1,535,661 | Garrity | Apr. 28, 1925 |
| 1,675,565 | Lee | July 3, 1928 |
| 1,855,311 | Rasner | Apr. 26, 1932 |

FOREIGN PATENTS

| Number | Country | Date |
| --- | --- | --- |
| 680,327 | France | Jan. 18, 1930 |